July 15, 1930.　　　　E. F. MARTINET　　　　1,770,669
SWIVEL CONNECTER
Filed Aug. 31, 1927
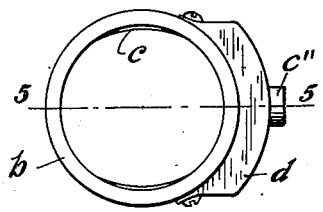
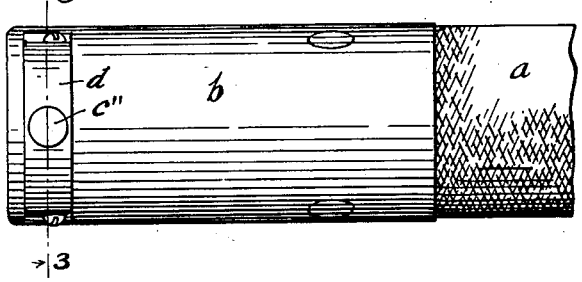
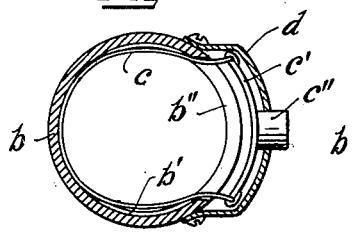
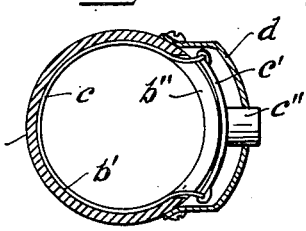
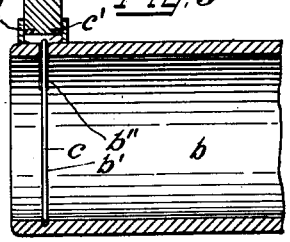
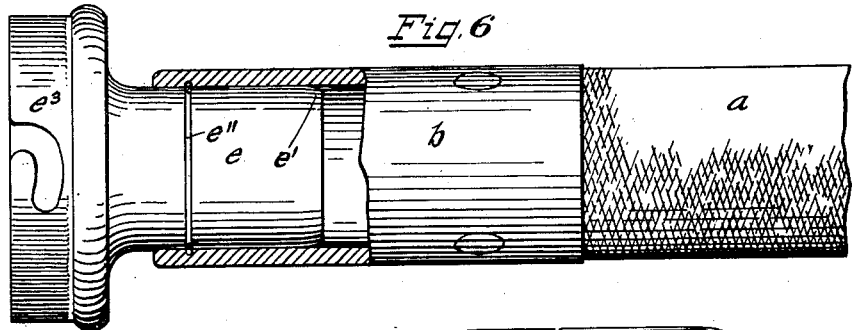
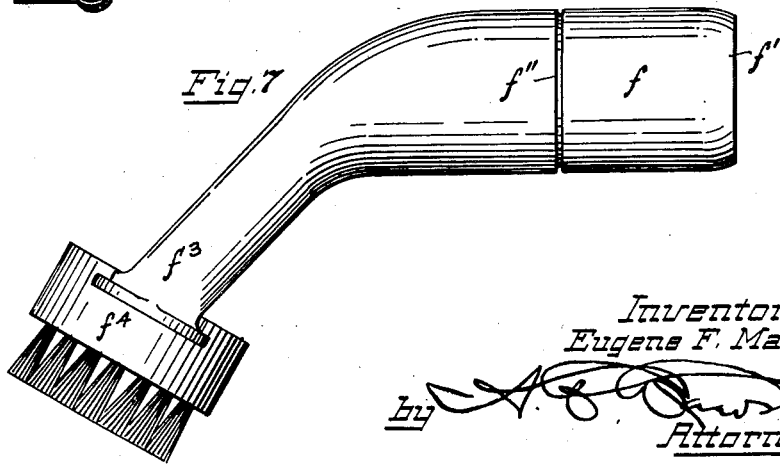
Inventor:
Eugene F. Martinet
by
Attorney.

Patented July 15, 1930

1,770,669

UNITED STATES PATENT OFFICE

EUGENE F. MARTINET, OF CLEVELAND, OHIO, ASSIGNOR TO THE P. A. GEIER COMPANY, OF CLEVELAND, OHIO, A CORPORATION OF OHIO

SWIVEL CONNECTER

Application filed August 31, 1927. Serial No. 216,586.

My invention relates to improvements in swivel connecter, and more particularly to a type of connecter adapted removably to unite two telescoping members, the object thereof being the provision of cheap, simple and efficient means for temporarily effecting the swivel connection of two coacting members.

The prime utility of the present embodiment of my invention is the ready connection of a hose member with a suction cleaning tool to afford a semi-permanent swiveled union thereof, permitting also of their ready disconnection, as for changing the tools or storing the apparatus. With this type of apparatus it is most desirable to provide a type of connection that is not liable to get out of order with unskilled use. Moreover, the easy swivel movement both of the tool and connecting hose is required for insuring the best results in cleaning as well as for convenient handling of the hose and suction cleaning tool.

The essentials of the instant coupling mechanism, provided for two cylindrical telescoping members, are registering exterior and interior annular slots or grooves in association with an annular resilient coupling member or wire normally flattened on opposite sides in an elliptic form to be positioned in connecting relation within portions of both of these slots or grooves, whereby the telescoping members are retained in swiveled relation for use. The resilient coupling member is provided with means for flexing the flattened sides outward for forcing it into the groove in the outer member so as to clear the opposing groove in the inner member and permit the separation of the connected telescoping members.

The features of my improved construction and the preferred embodiment and use may best be explained in connection with the accompanying drawings, wherein:

Figure 1 is an end view of the exterior telescoping connecter member,

Fig. 2 is a view in elevation of the hose terminal and connecter,

Fig. 3 is a vertical section on line 3—3, Fig. 2, showing the connecter wire in its elliptical connecting position, Fig. 4 is a similar section showing the connecter wire retracted within the groove for releasing the normally connected members, Fig. 5 is a fragmentary longitudinal section on line 5—5, Fig. 1, Fig. 6 is a view in elevation, partially broken away and in section, to illustrate the swivel connection of the hose with an attaching member therefor, and Fig. 7 is a view in side elevation of a suction tool comprising a nozzle and brush adapted to be removably connected at the end of the hose.

Throughout the several figures of the drawings I have employed the same character of reference to indicate similar parts.

One or both ends of the hose $a$ may be provided with the outer tubular swivel connecter member $b$, as shown in Figs. 2 and 6. As best indicated in Figs. 3 and 4, said tubular member $b$ is provided with an interior slot or groove $b'$, adapted to accommodate the resilient wire loop connecter $c$ normally having the elliptical form flattened on opposite sides, as indicated in Figs. 1 and 3, so that the sides of the ellipse will lie inside the bore of the outer tubular member $b$. The ends of the wire $c$ are firmly connected to a forked yoke $c'$ positioned above the open slotted portion $b''$ covered by the housing $d$, through which the actuating stem $c''$ protrudes. Upon the depression of this stem, as in Fig. 4, the wire loop $c$ immediately is flexed outward to assume substantially circular form entirely within the slot or groove $b'$, flush with the interior bore of member $b$.

The inner telescoping member, two different types of which are shown respectively in Figs. 6 and 7, preferably is provided with a tubular portion $e$ or $f$ terminally beveled at $e'$ or $f'$ and annular grooved or slotted at $e''$ or $f''$ at a distance therefrom, respectively. The member shown in Fig. 6 attached at the end of the hose is provided with a terminal cap $e^3$ forming a suitable attachment for the hose upon the suction producing appliance (not shown). It will be observed that the wire $c$ normally embraces both sides of the groove $e''$ and affords a swivel connection for these parts that may readily be released, as required.

It will be appreciated that the tool of Fig. 7, comprising a suction nozzle $f^3$ and a slotted removable brush $f^4$ positioned forwardly of the tubular portion $f$, may be inserted in the opposite end of the hose which we may assume is shown in Figs. 1, 2 and 5; the connecting means being identical, however, at both ends of the hose. The annular slot or groove $f''$ would be similarly engaged by the wire loop $c$ normally occupying a portion only of the groove $b'$ in the outer tubular member, so that the tool is afforded temporary swivel connection permitting it to assume automatically various cleaning positions to conform with the hanging, upholstery, or other surface being cleaned. Obviously, the tool may quickly be removed and replaced by another tool similarly constructed for insertion within the connecter member.

Having now described the preferred embodiment of my invention, together with its present adaptation, advantages and use, I claim as new and desire to secure by Letters Patent, the following:

1. The combination of outer and inner cylindrical telescoping members, there being an interior annular groove in the outer member and an exterior annular registering groove in the inner member, a connecting member for said telescoping members comprising a single annular elliptical shaped resilient wire loop for engaging in portions of each of the grooves, and operating means secured to said connecting member for temporarily flexing the sides of the loop outwardly into the groove of the outer member, to permit a separation of the telescoping members.

2. The combination of outer and inner cylindrical telescoping members, there being an interior annular groove in the outer member and an exterior annular registering groove in the inner member, a connecting member for said telescoping members comprising a single annular elliptical shaped resilient wire loop for engaging in portions of each of the grooves, and a forked yoke secured to the wire loop for temporarily flexing the flattened sides of the loop outward into the groove of the outer member to permit a separation of the telescoping members.

In testimony whereof I do now affix my signature.

EUGENE F. MARTINET.